United States Patent
Piccini et al.

(10) Patent No.: US 9,914,593 B1
(45) Date of Patent: Mar. 13, 2018

(54) SYSTEM AND METHOD OF ROLLING MATERIAL IN A CONVEYOR ENVIRONMENT

(71) Applicant: BERRY GLOBAL FILMS, LLC, Evansville, IN (US)

(72) Inventors: Joe Piccini, Grand Prairie, TX (US); Nicholas F. Forte, Monroe, NY (US)

(73) Assignee: Berry Global Films, LLC, Evansville, IN (US)

( * ) Notice: Subject to any disclaimer, the term of this patent is extended or adjusted under 35 U.S.C. 154(b) by 0 days.

(21) Appl. No.: 15/346,191

(22) Filed: Nov. 8, 2016

(51) Int. Cl.
*B65G 17/24* (2006.01)
*B65G 17/18* (2006.01)

(52) U.S. Cl.
CPC ............ *B65G 17/18* (2013.01); *B65G 17/24* (2013.01); *B65G 2201/0232* (2013.01)

(58) Field of Classification Search
CPC ........ B65G 17/20; B65G 17/24; B65G 13/06; B65H 19/26; B65H 19/30; B65H 19/22; B65H 19/267; B65H 16/08; B65H 2511/142; B65H 2301/41812
USPC .................. 198/779, 385, 386, 387, 397.06; 242/541, 560.1, 564.4, 595.1, 533; 414/911, 746.7; 72/127
See application file for complete search history.

(56) References Cited

U.S. PATENT DOCUMENTS

| | | | | |
|---|---|---|---|---|
| 3,521,847 A * | 7/1970 | Porter | ..................... | A47B 25/00 108/156 |
| 4,083,119 A * | 4/1978 | Yacura | ................... | F26B 15/122 104/172.1 |
| 4,628,615 A * | 12/1986 | Verheyden | ............... | C04B 33/32 34/105 |
| 5,040,667 A * | 8/1991 | Kamita | ................... | B65G 17/24 198/779 |
| 6,669,002 B2 * | 12/2003 | Itoh | ........................ | B65G 19/02 198/397.06 |
| 2004/0251373 A1 * | 12/2004 | Denker | .................... | B21C 47/24 242/533 |
| 2007/0095968 A1 * | 5/2007 | Kusel | ..................... | B65H 16/08 242/541 |

* cited by examiner

*Primary Examiner* — James R Bidwell
(74) *Attorney, Agent, or Firm* — Barnes & Thornburg LLP

(57) ABSTRACT

A transportation system with a roll of material having an unsecured material portion is disclosed. The transportation system includes a first roller and a second roller spaced apart from the first roller. The spacing between the first roller and the second roller define a cradle. The cradle is operable to receive the roll of material, the roll of material having the unsecured material portion. At least one of the first roller and the second roller is rotatable about its axis to facilitate a securing of the unsecured material portion of the roll of material.

17 Claims, 4 Drawing Sheets

SYSTEM AND METHOD OF ROLLING MATERIAL IN A CONVEYOR ENVIRONMENT

TECHNICAL FIELD

This disclosure relates to a system and a method of rolling material in a conveyor environment.

BACKGROUND

This section provides background information related to the present disclosure and is not necessarily prior art.

To meet the demands of industry, material producers often provide bulk material in roll form. For example, plastics have widespread use in a variety of fields ranging from commercial packaging to consumer food preservation and plastic producers often use bulk material. Besides being a bulk form, a roll of material enables various levels of a material supply chain to operate with improved efficiency. For example, material producers often may not want to convert their material to different shapes or sizes for every different plastic application. Fortunately, rolls of material allow secondary processors such as converters or die cutters to unwind the roll of material and convert the material as necessary. With a roll of material, a secondary processor may be more efficient by operating at greater throughput speeds than, for example, the same processor would with sheet to sheet processing and decreasing material handling. Due to the frequent use of rolls of material especially in plastic, paper, and textile manufacturing, a roll of material must often be transported throughout a manufacturing plant.

While systems and methods for transporting rolls of material have proven useful for their intended purposes, a need for continuous improvement in the pertinent art remains.

SUMMARY

One aspect of the disclosure provides a transportation system with a roll of material having an unsecured material portion. The transportation system includes a first roller and a second roller spaced apart from the first roller. The spacing between the first roller and the second roller define a cradle. The cradle is operable to receive the roll of material, the roll of material having the unsecured material portion. At least one of the first roller and the second roller is rotatable about its axis to facilitate a securing of the unsecured material portion of the roll of material.

Implementations of the disclosure may include one or more of the following optional features. In some implementations, the first roller and the second roller rotate about their axes to facilitate the securing of the unsecured material portion of the roll of material. The system may also include a driver operable to drive the cradle from the first cradle position to the second cradle position. The second cradle position may be forward of the first cradle position.

In some examples, the system includes a rotator in contact with at least one of the first roller and the second roller. The rotator may rotate the at least one of the first roller and the second roller from a first position to a second position. The second position may include securing the unsecured material portion of the roll of material. The rotator may rotate both the first roller and the second roller. The rotator may be a friction plate, a third roller, or a series of grooves on at least one roller engaged with a drive system.

In some implementations, the system includes a driver operable to drive the cradle from a first cradle position to a second cradle position. The second cradle position may be forward of the first cradle position. At the second cradle position, at least one of the first roller and the second roller may rotate to the second position.

Another aspect of the disclosure provides a transportation system with a roll of material having an unsecured material portion. The transportation system includes a plurality of rollers and a rotator communicating with at least one of the first roller and the second roller. The plurality of rollers includes a first roller and a second roller. The first roller and the second roller may have a spacing defining a cradle. The cradle may be operable to receive the roll of material, the roll of material having the unsecured material portion. The plurality of rollers may be movable to translate about their axes.

This aspect may include one or more of the following optional features. In some implementations, the rotator communicates with both the first roller and the second roller. The rotator may be a friction plate, a third roller, or a series of grooves in at least one of the first roller and the second roller engaged with a drive system. The system may also include a driver operable to drive the cradle from a first cradle position to a second cradle position. The second cradle position may be forward the first cradle position. At the second cradle position, the rotator may rotate at least one of the first roller and the second roller from a position to a second position. The second position may secure the unsecured material portion of the roll of material.

Yet another aspect of the disclosure provides a method of securing the roll of material with an unsecured material portion. The method includes receiving the roll of material between a first roller and a second roller. The method also includes rotating at least one of the first roller and the second roller about its axis to facilitate the securing of the unsecured material portion of the roll of material.

This aspect may include one or more of the following optional features. In some implementations, the step of rotating includes rotating both the first roller and the second roller. Rotating may also include rotating at least one of the first roller and the second roller with a rotator. The rotator may be a friction plate, a third roller, or a series of grooves on at least one of the first roller and the second roller engaged with a drive system. The drive system may be a belt or a chain configuration.

In some examples, the method includes driving the first roller and the second roller from a first position to a second position. The second position may be forward of the first position. Driving the first roller and the second roller may occur substantially simultaneously to rotate at least one of the first roller and the second roller about its axis to facilitate the securing of the unsecured material portion of the roll of material.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

As a material processor transports a roll of material during stages of manufacturing, the roll generally includes an unsecured or a trailing portion of the material. This trailing web can interfere with the transporting of the rolls if the trailing web is not completely wound to the roll and secured. Common ways to secure this trailing web include applying selective adhesive, glue, tape, or epoxy to the end of the tail. Yet, these common methods are additive processes increasing the cost and the complexity of the transportation process. The present disclosure describes a transportation system that secures the trailing web to the roll during transportation without the need for these additive processes. The transportation system is not limited to any particular industry and may be used by a wide range of industries including plastics, paper, and textiles, for example. In some implementations, the transportation winds the trailing edge of the web as the roll moves to the next stage of manufacturing.

Figure 1A:
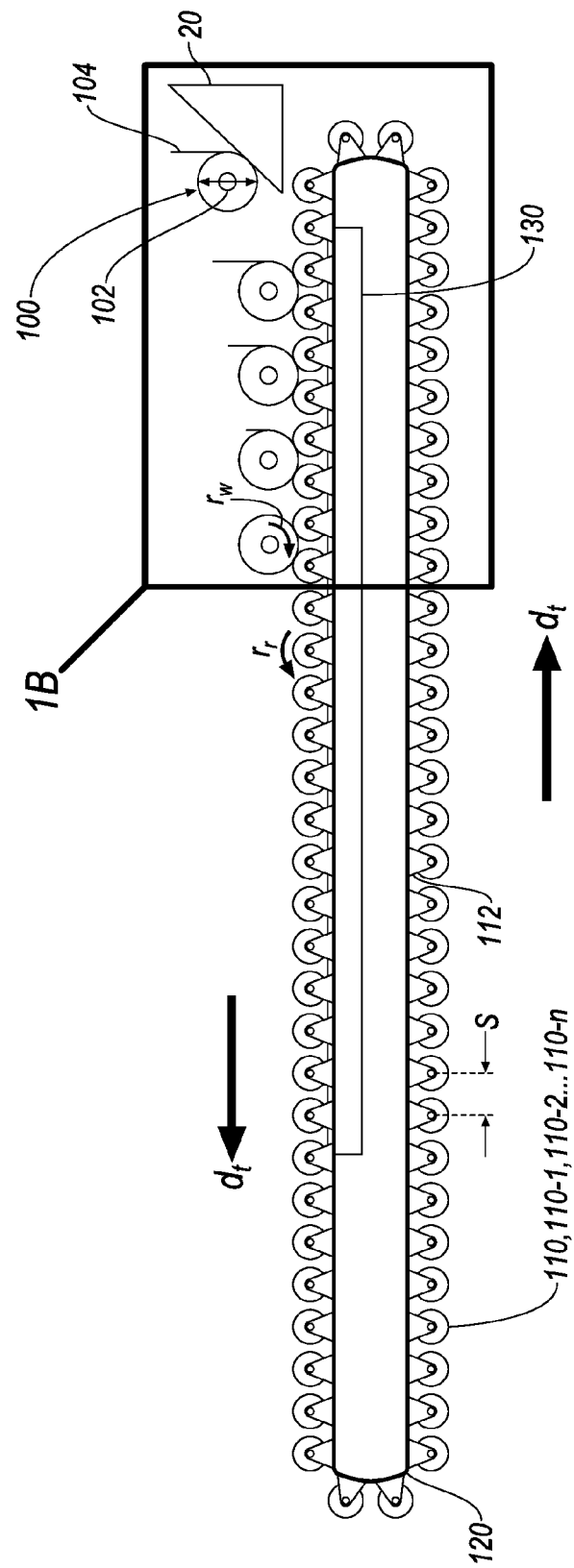
FIG. 1A is a side view of an example of a transportation system.

Referring to FIG. 1A, in some implementations, a transportation system 10 includes at least one roll of material 100, a system of rollers 110 and a transportation path 120. The roll of material 100 generally includes a core 102, a length of material wound onto the core $d_{rf}$ and a width of material proportional to the width of the core. The material may be a roll of the following: bags, plastic, paper, fabric, mesh, foil, or other similar material capable of being wound on a core. The roll of material 100 has tail of trailing web that is an unsecured material portion 104. In some examples, the roll of material 100 enters the transportation system 10 from a previous stage of manufacturing. The previous stage of manufacturing may cut, slit, or generally process the roll of material to cause an exposed end portion of webbing length, the unsecured material portion 104.

In some examples, the system the rollers 110 has n number of rollers, 110-1, 110-2, 110-3 . . . 110-n. The number of rollers n may vary depending on a distance of transport for the roll of material 100. For example, FIG. 1A depicts a configuration of rollers where the number of rollers n is sixty-sixty. Each roller is mounted side by side with an amount of spacing s between each adjacent roller. The spacing forms a cradle to receive and to securely seat a roll of material 100. The roll of material 100 is delivered to the transportation system 10 from the previous stage of manufacturing by a delivery system 20. The delivery system 20 may be a ramp or any guide system that seats the roll of material 100 within the cradle. After securely seated in the cradle, the roll of material 100 may travel from a first cradle position $cp_1$ to a second cradle position $cp_2$. The second cradle position $cp_2$ forward of the first cradle position $cp_1$ in a direction of travel $d_t$ of the transportation system 10.

The transportation path 120 travels in the direction of travel $d_t$ to convey material to another stage in the manufacturing process. The transportation path is connected to the system of rollers 110 such that the system of rollers 110 also may move in the direction of travel $d_t$. In some examples, the system of rollers 110 includes roller supports 112-1, 112-2 . . . 112-2n at a distal 112d and a proximal end 112p of each roller (e.g., 110-1-110-n). The roller supports 112d, 112p may be secured to the transportation path by any method that permits a roller (e.g., 110-1-110-n) to rotate about a fixed axis perpendicular to the direction of transportation $d_t$. For example, the roller supports 112p, 112d and the transportation path 120 are connected together by fasteners (e.g., nails, screws, bolts, rivets, epoxy, adhesive, welded joints, or etc.). The transportation path 120 may be any conveyor system capable of transporting the roll of material 100 from a first location to a second location. For example, the transportation path 120 may be a chain track, a belt track, or another system of rollers. The transportation path 120 facilitates the movement of the cradle between positions by a driver operable to drive the cradle such as a motor.

To facilitate the securing of the unsecured material portion 104 of the roll of material 100, at least one roller of the system of rollers 110 rotates in a direction $r_w$ to wind the unsecured material portion 104 towards the core 102 of the roll of material 100. In some examples, such as FIG. 1A, the rollers 110 rotate in a rotation direction $r_r$ identical to a direction of transportation $d_t$. The roller rotation $r_r$ winds the unsecured material portion 104 to the roll of material 100 during transport in the transportation system 10. As FIG. 1A depicts, a roll of material 100 may travel from a first cradle position $cp_1$ to a second cradle position $cp_2$ with the unsecured material portion 104 winding to the core 102 of the roll of material 100 during the travel.

In some implementations, the amount of spacing s between the rollers may vary or may be adjusted to account for the size of the roll of material 100. The length and the width of the material will vary based on different applications and manufacturing processes before the transportation system 10. In some examples, the application may require a thicker material that may increase the diameter $d_{rf}$ of the roll of material 100. Other applications may require a thin material that may decrease the diameter $d_{rf}$ of the roll of material 100. The size of the roll of material 100 of material may also vary depending on the length of webbing wound onto the core 102 of the roll of material 100. Additionally, in some examples, the transportation system 10 may supply a converting process where the roll of material 100 would be greater in mass or thickness diameter $d_{rf}$ before the converting process than after the converting process is complete. In other examples, the transportation system 10 may transport a converted roll of material 100 that has decreased in mass or thickness diameter $d_{rf}$ from the converting process.

Figure 1B:
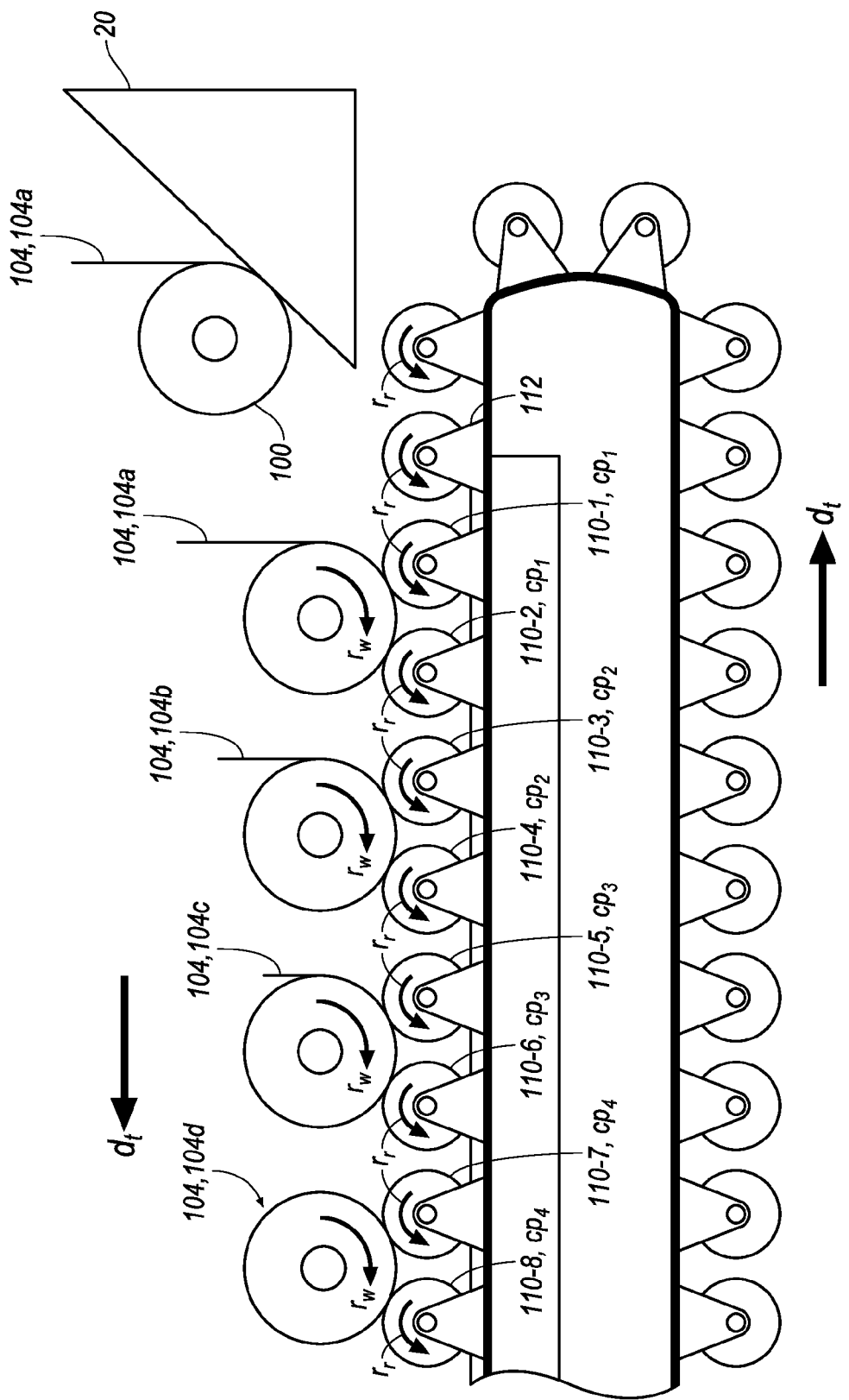
FIG. 1B is a side view of a close-up of a portion of the example transportation system.
Figure 2A:
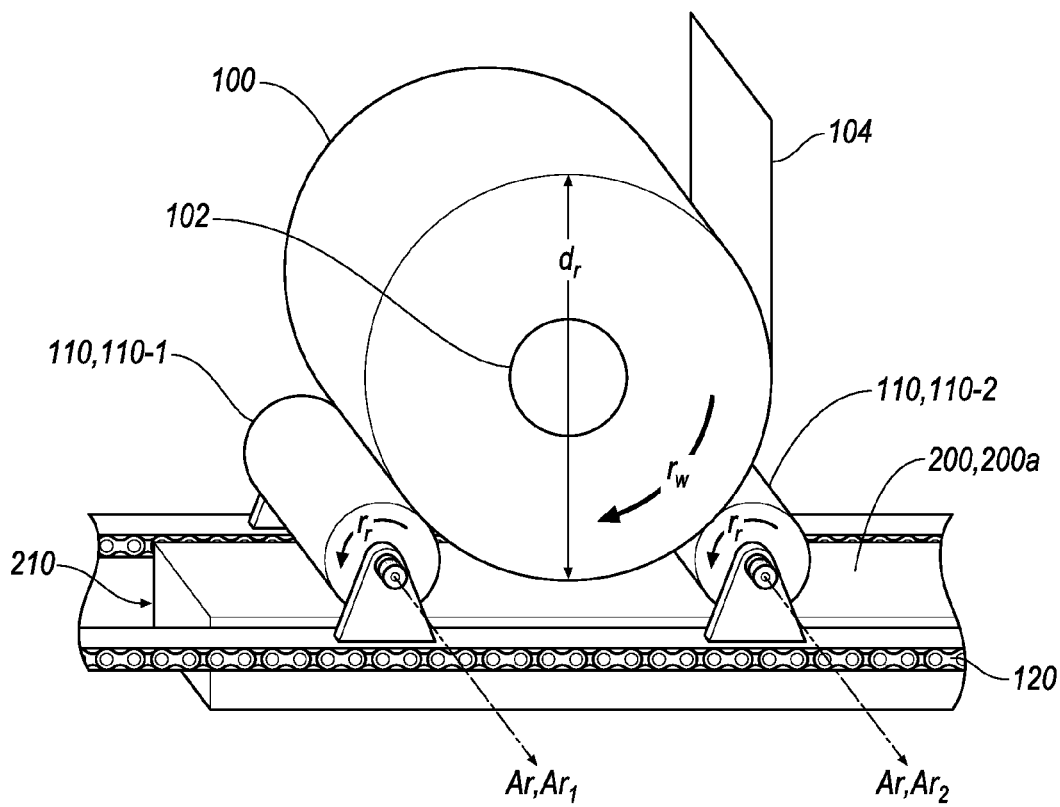
FIG. 2A is a perspective view of an example of a transportation system.

FIG. 1B is an enlarged view of a portion of the transportation system 10 of FIG. 1A referenced in FIG. 1A as 1B. Referring to FIG. 1B, in some examples, the roll of material 100 is delivered from a delivery system 20. The roll of material 100 has an unsecured material portion 104. The unsecured material portion 104 may be wound to a core of the roll of material 100 with either clockwise rotation or counterclockwise rotation. In FIG. 1B, transportation system 10 would facilitate the securing of the unsecured material portion 104 by counterclockwise rotation or winding. The required rotation, however, depends on how the roll of material is delivered to the transportation system 10. The delivery system 20 may be a ramp or any guide system that seats the roll of material 100 within a cradle. In some instances like FIG. 1B, a first roller 110, 110-1 spaced apart from a second roller 110, 110-2 forms the cradle. The cradle where the roll of material 100 is delivered is a first cradle position $cp_1$. The roll of material 100 may travel along the transportation system 10 from the first cradle position $cp_1$ to a second cradle position $cp_2$ to a third cradle position $cp_3$ to a fourth cradle position $cp_4$. While the roll of material 100 travels along the transportation system 10, the unsecured material portion 104 winds toward a secured position 104, 104d into the core 102 of the roll of material 100. The securing of the unsecured material portion 104 occurs because the friction between a surface of the rollers 110-1, 110-2 and a surface of the roll of material 100 rotates the roll of material 100. FIG. 1B depicts how the unsecured material portion 104 may wind to the secured position 104d at each cradle position $cp_{1-4}$. For example, the second cradle position $cp_2$ has wound the unsecured material portion 104b, $cp_2$ more than the first cradle position 104a, $cp_1$ and the third cradle position $cp_3$ has wound the unsecured material portion 104c, $cp_3$ more than the second cradle position 104b, $cp_2$ (e.g., 104a-d). During the winding process, the rollers 110-1, 110-2 may rotate at the same rotational speed, at independent rotational speeds, or one of the rollers may rotate at a rotational speed while the other is stationary. FIG. 2A illustrates additional implementations for the transportation system 10. The transportation system 10 of FIG. 2 includes a first roller 110, 110-1 and a second roller 110, 110-2 spaced apart from the first roller 110-1. The spacing between the first roller 110-1 and the second roller 110-2 forms a cradle where a roll of material 100 rests. The roll of material 100 generally includes a core 102, a length of material wound onto the core $d_{rf}$, and a width of material proportional to the width of the core. The roll of material 100 has tail of trailing web that is an unsecured material portion 104. Beneath the first roller 110-1 and the second roller 110-2 is rotator 200. The rotator is a friction plate 200, 200a that includes at least a friction portion 210 in contact with at least one of the first roller 110-1 and the second roller 110-2. The spacing between the first roller 110-1 and the second roller 110-2 is such that the roll of material 100 does not contact a friction plate 200, 200a. The friction between the friction portion 210 of the friction plate 200, 200a and the rollers 110 may cause the rollers 110-1, 110-2 to rotate $r_r$ about an axis perpendicular to the direction of travel $d_t$ of the transportation system 10. The rotation of the rollers $r_r$ permits the roll of material 100 to rotate $r_w$ in a direction opposite the direction of rotation of the rollers $r_r$. The roll of material 100 rotates $r_w$ because the friction between the surface of the rollers 110-1, 110-2 and the surface of the roll of material 100. The frictional rotation $r_w$ of the roll of material 100 causes the tail of trailing web that is the unsecured material portion 104 of the roll of material 100 to wind into the core 102 (e.g., FIG. 1B 104a-d). Alternatively, the friction plate 200, 200a may be beneath either one roller 110-1 or 110-2 or both rollers 110-1, 110-2. When the transportation system 10 may be the system of rollers 110-1, 110-2, 110-3 . . . 110-n, friction plates may be selectively placed under particular rollers or continuously under the entire system of rollers 110-1, 110-2, 110-3, . . . 110-n. The rotator 200 may also be an independent system of rollers beneath the system of rollers 110-1, 110-2, 110-3 . . . 110-n frictionally engaging the roll of material 100. In that aspect, the independent system of rollers are rotatable to cause surface friction forces on the system of roller 110-1, 110-2, 110-3, . . . 110-n to rotate the roll of material 100 to facilitate securing of the unsecured material portion 104.

Figure 2B:
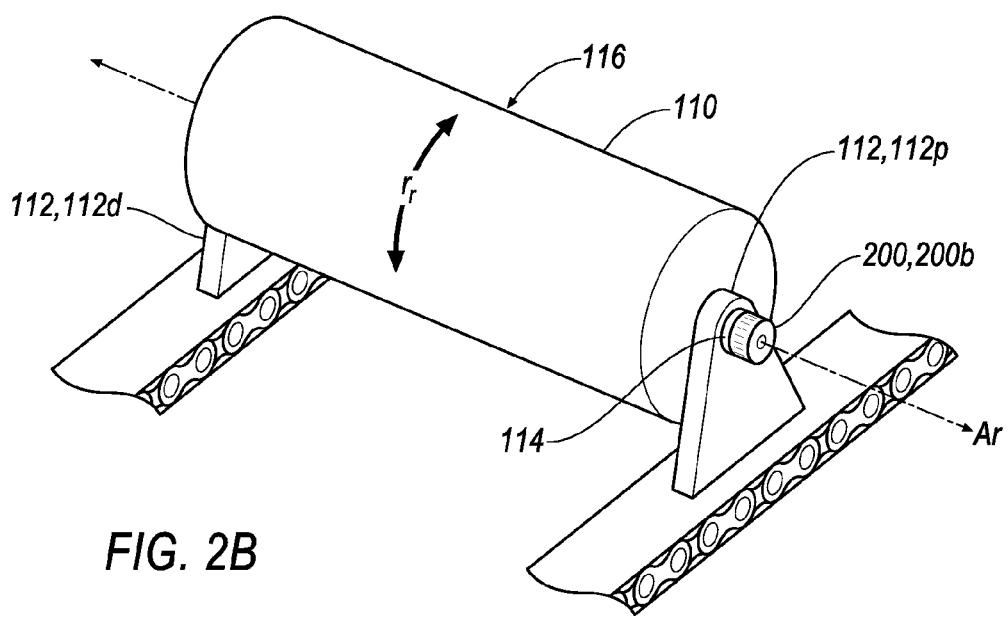
FIG. 2B is a perspective view of a close-up portion of an example transportation system component.

As shown in FIG. 2B, in other implementations, the rotator 200, 200b of the roller 110 is driven by a drive system. The roller 110 has a roller support 112a, 112b at each end of the roller 110, a shaft 114, and a roller surface 116. The roller support 112a, 112b holds the shaft 114 of the roller 110 such that the roller 110 may rotate $r_r$. To permit roller rotation $r_r$, the roller support 112 may use a bearing or other device minimizing friction between the roller support 112 and the shaft 114. The rotator 200, 200b may be a series of grooves at the end of the shaft 114 such that the drive system (e.g., a drive chain, a drive belt, a series of gears, etc.) engages within the series of grooves of the rotator 200, 200b. The drive system is configured to rotate $r_r$ the roller 110 about the axis $A_r$ coincident with the shaft 114 of the roller 110. An example of the drive system may be a drive chain or a drive belt driven by a motor. During rotation, the roller surface 116 contacts the roll of material 100 causing the roll of material 100 to rotate $r_w$ in a direction opposite the roller 110.

Figure 3:
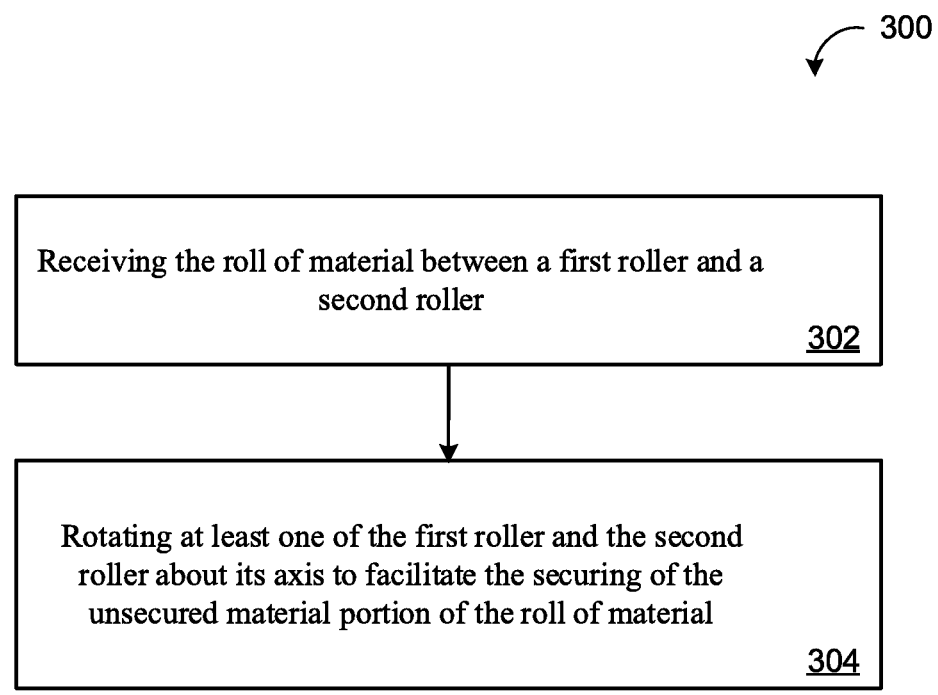
FIG. 3 is a flowchart of an example method of transporting a roll of material.

FIG. 3 provides an example arrangement of operations of a method 300 of transporting a roll of material. At block 302, the method 300 includes receiving the roll of material 100 between the first roller 110-1 and the second roller 110-2. At block 304, the method 300 includes rotating $r_r$ at least one of the first roller 110-1 and the second roller 110-2 about its axis $A_r$ to facilitate the securing of the unsecured material portion 104 of the roll of material 100. At block 302, the method 300 may include rotating $r_r$ both the first roller 110-1 and the second roller 110-2. Alternatively, block 302 may include rotating $r_r$ at least one of the first roller 110-1 and the second roller 110-2 with the rotator 200. The rotator may be the friction plate, the third roller, or the series of grooves on at least one of the first roller 110-1 and the second roller 110-2 engaged with a drive system. As an example, the drive system is a belt or a chain configuration. The method of 300 may further include driving the first roller 110-1 and the second roller 110-2 from a first position to a second position where the second position is forward of the first position. When the method 300 includes driving the first roller 110-1 and the second roller 110-2 from the first position 110-1, $cp_1$ to the second position 110-2, $cp_2$, the driving of the first and the second roller may occur substantially simultaneously to rotating $r_r$ at least one of the first roller 110-1 and the second roller 110-2 about its axis $A_r$ to facilitate the securing of the unsecured material portion 104 of the roll of material 100.

A number of implementations have been described. Nevertheless, it will be understood that various modifications may be made without departing from the spirit and scope of the disclosure. Accordingly, other implementations are within the scope of the following claims.

What is claimed is:

1. A transportation system with a roll of material having an unsecured material portion, the transportation system comprising:
    a first roller,
    a second roller spaced apart from the first roller, the spacing between the first roller and second roller defining a cradle, the cradle operable to receive the roll of material, the roll of material having the unsecured material portion, and
    a rotator, the rotator contacting at least one of the first roller and the second roller, the rotator rotates the at least one of the first roller and the second roller from a first position to a second position, the second position securing the unsecured material portion of the roll of material,
    wherein at least one of the first roller and the second roller is rotatable about its axis to facilitate a securing of the unsecured material portion of the roll of material.

2. The transportation system of claim 1, wherein both the first roller and the second roller rotate about their axes to facilitate the securing of the unsecured material portion of the roll of material.

3. The transportation system of claim 1, further comprising a driver operable to drive the cradle from a first cradle position to a second cradle position, the second cradle position forward of the first cradle position.

4. The transportation system of claim 1, wherein the rotator rotates both the first roller and the second roller.

5. The transportation system of claim 1, wherein the rotator is a friction plate, a third roller, or a series of grooves on at least one roller engaged with a drive system.

6. The transportation system of claim 1, further comprising a driver operable to drive the cradle from a first cradle position to a second cradle position, the second cradle position forward of the first cradle position.

7. The transportation system of claim 6, wherein at the second cradle position at least one of the first roller and the second roller have rotated to the second position.

8. A transportation system with a roll of material having an unsecured material portion, the transportation system comprising:
   a plurality of rollers, the plurality including a first roller and a second roller, the first roller and the second roller having a spacing defining a cradle, the cradle operable to receive the roll of material, the roll of material having the unsecured material portion, and
   a driver operable to linearly drive the cradle from a first cradle position to a second cradle position, the second cradle position linearly forward of the first cradle position,
   wherein the plurality of rollers are movable to translate about their axes; and a rotator communicating with at least one of the first roller and the second roller.

9. The transportation system of claim 8 wherein the rotator communicates with both the first roller and the second roller.

10. The transportation system of claim 8, wherein the rotator is a friction plate, a third roller, or a series of grooves in at least one of the first roller and the second roller engaged with a drive system.

11. The transportation system of claim 8, wherein at the second cradle position the rotator has rotated at least one of the first roller and the second roller from a first position to a second position, the second position securing the unsecured material portion of the roll of material.

12. A method of securing a roll of material with an unsecured material portion, the method comprising:
    receiving the roll of material between a first roller and a second roller,
    driving the first roller and the second roller in a linearly forward direction from a first position to a second position, the second position forward of the first position, and
    rotating at least one of the first roller and the second roller about its axis to facilitate the securing of the unsecured material portion of the roll of material.

13. The method of securing of claim 12 wherein the step of rotating includes rotating both the first roller and the second roller.

14. The method of securing of claim 12, wherein rotating includes rotating at least one of the first roller and the second roller with a rotator.

15. The method of securing of claim 14, wherein the rotator is a friction plate, a third roller, or a series of grooves on at least one of the first roller and the second roller engaged with a drive system.

16. The method of securing of claim 15, wherein the drive system is a belt or a chain configuration.

17. The method of securing of claim 12, wherein driving the first roller and the second roller occurs substantially simultaneously to rotating at least one of the first roller and the second roller about its axis to facilitate the securing of the unsecured material portion of the roll of material.

* * * * *